(12) United States Patent
Schimik

(10) Patent No.: US 11,016,490 B2
(45) Date of Patent: May 25, 2021

(54) METHOD FOR OPERATING A MOTOR VEHICLE IN A FULLY AUTONOMOUS DRIVING MODE

(71) Applicant: AUDI AG, Ingolstadt (DE)

(72) Inventor: Viktor Schimik, Bretzfeld (DE)

(73) Assignee: AUDI AG, Ingolstadt (DE)

(*) Notice: Subject to any disclaimer, the term of this patent is extended or adjusted under 35 U.S.C. 154(b) by 101 days.

(21) Appl. No.: 16/339,926

(22) PCT Filed: Oct. 24, 2017

(86) PCT No.: PCT/EP2017/077099
§ 371 (c)(1),
(2) Date: Apr. 5, 2019

(87) PCT Pub. No.: WO2018/086867
PCT Pub. Date: May 17, 2018

(65) Prior Publication Data
US 2020/0026295 A1 Jan. 23, 2020

(30) Foreign Application Priority Data
Nov. 9, 2016 (DE) .......................... 102016222006.3

(51) Int. Cl.
*G05D 1/02* (2020.01)
*G01C 21/34* (2006.01)
(Continued)

(52) U.S. Cl.
CPC .......... *G05D 1/0212* (2013.01); *B60R 25/24* (2013.01); *G01C 21/343* (2013.01);
(Continued)

(58) Field of Classification Search
CPC .............. G01C 21/3407; G01C 21/343; G01C 21/362; G05D 1/0088; G05D 1/0212;
(Continued)

(56) References Cited

U.S. PATENT DOCUMENTS 9,194,168 B1 * 11/2015 Lu .................... G06K 9/00805
9,552,564 B1 * 1/2017 Martenis ................ G07C 5/008
(Continued)

FOREIGN PATENT DOCUMENTS

DE 102008036660 A1 5/2009
DE 102011120991 A1 1/2013
(Continued)

OTHER PUBLICATIONS

Lafrance, Adrienne, "How Self-Driving Cars Will Threaten Privacy", The Atlantic, Mar. 21, 2016, 6 pages (Year: 2016).*
(Continued)

*Primary Examiner* — Faris S Almatrahi
*Assistant Examiner* — David A Testardi
(74) *Attorney, Agent, or Firm* — Sterne, Kessler, Goldstein & Fox P.L.L.C

(57) ABSTRACT

The disclosure relates to a method for operating a piloted motor vehicle, comprising the following steps carried out by a control device: determining a parking time period and a parking location of the motor vehicle on the basis of an appointment calendar signal received from a mobile terminal, which appointment calendar signal describes at least one appointment and a waiting location of the motor vehicle associated with the appointment, and creating an operating plan for the motor vehicle in accordance therewith. In accordance with at least one task signal, each of which describes a travel destination to which the motor vehicle should drive, a linking route for linking at least one travel destination to the parking location and a corresponding travel time are determined. A time window for traveling the linking route is determined with the travel time as a minimum length, and a navigation signal, which describes the linking route, is transferred to a navigation device for
(Continued)

controlling the motor vehicle along the linking route in the determined time window.

12 Claims, 1 Drawing Sheet

(51) Int. Cl.
  *G06Q 10/10*   (2012.01)
  *B60R 25/24*   (2013.01)
  *G01C 21/36*   (2006.01)
  *G05D 1/00*   (2006.01)

(52) U.S. Cl.
  CPC ....... *G01C 21/362* (2013.01); *G01C 21/3691* (2013.01); *G05D 1/0011* (2013.01); *G05D 1/0276* (2013.01); *G06Q 10/1095* (2013.01)

(58) Field of Classification Search
  CPC ......... G05D 2201/0213; G06Q 10/109; G06Q 10/1095; G06Q 10/1097; B60R 25/24; B62D 15/0285
  See application file for complete search history.

(56) References Cited

U.S. PATENT DOCUMENTS

| | | | |
|---|---|---|---|
| 9,810,543 B2 | 11/2017 | Hoch et al. | |
| 9,835,465 B2 | 12/2017 | Stefan | |
| 9,838,529 B2 | 12/2017 | Brautigam et al. | |
| 10,126,743 B2 | 11/2018 | Fukumoto | |
| 10,901,415 B1* | 1/2021 | Herbach | G06Q 10/02 |
| 2013/0231824 A1* | 9/2013 | Wilson | G01C 21/3415 |
| | | | 701/26 |
| 2015/0338852 A1* | 11/2015 | Ramanujam | G08G 1/202 |
| | | | 701/2 |
| 2015/0346727 A1* | 12/2015 | Ramanujam | B62D 15/0285 |
| | | | 701/23 |
| 2015/0348335 A1 | 12/2015 | Ramanujam | |
| 2015/0379468 A1 | 12/2015 | Harvey | |
| 2016/0203649 A1* | 7/2016 | Berkobin | G06Q 30/0609 |
| | | | 705/13 |
| 2016/0273922 A1* | 9/2016 | Stefan | G06Q 10/00 |
| 2016/0332535 A1* | 11/2016 | Bradley | B60N 2/002 |
| 2016/0351056 A1* | 12/2016 | Herbach | B60W 50/029 |
| 2017/0017920 A1 | 1/2017 | Stark et al. | |
| 2017/0021838 A1* | 1/2017 | Fontana | B60W 50/08 |
| 2017/0075358 A1 | 3/2017 | Zhang | |
| 2017/0175431 A1* | 6/2017 | Bradley | G06Q 10/083 |
| 2017/0329346 A1* | 11/2017 | Latotzki | G05D 1/0088 |
| 2018/0056903 A1* | 3/2018 | Mullett | B60R 16/037 |
| 2018/0068505 A1* | 3/2018 | Mullett | G05D 1/0022 |
| 2019/0271184 A1* | 9/2019 | Bradley | G05D 1/0276 |

FOREIGN PATENT DOCUMENTS

| | | |
|---|---|---|
| DE | 202014105330 U1 | 11/2014 |
| DE | 102014010345 B3 | 6/2015 |
| DE | 102014004673 A1 | 10/2015 |
| DE | 102015204947 A1 | 9/2016 |
| DE | 112015000359 T5 | 10/2016 |
| EP | 2767963 A1 * | 8/2014 |
| WO | WO-2012130388 A1 | 10/2012 |
| WO | WO-2015169204 A1 | 11/2015 |

OTHER PUBLICATIONS

International Search Report and Written Opinion of the International Searching Authority directed to related International Patent Application No. PCT/EP2017/077099, dated Jan. 18, 2018, with attached English-language translation; 21 pages.

Pierce, David, "Tesla Summon Hints at How the World of Self-Driving Cars Will Work," Wired Magazine, Jan. 18, 2016, available at: https://www.wired.com/2016/01/tesla-summon/; 3 pages.

International Preliminary Report on Patentability directed to related International Patent Application No. PCT/EP2017/077099, dated May 14, 2019, with attached English-language translation; 14 pages.

* cited by examiner

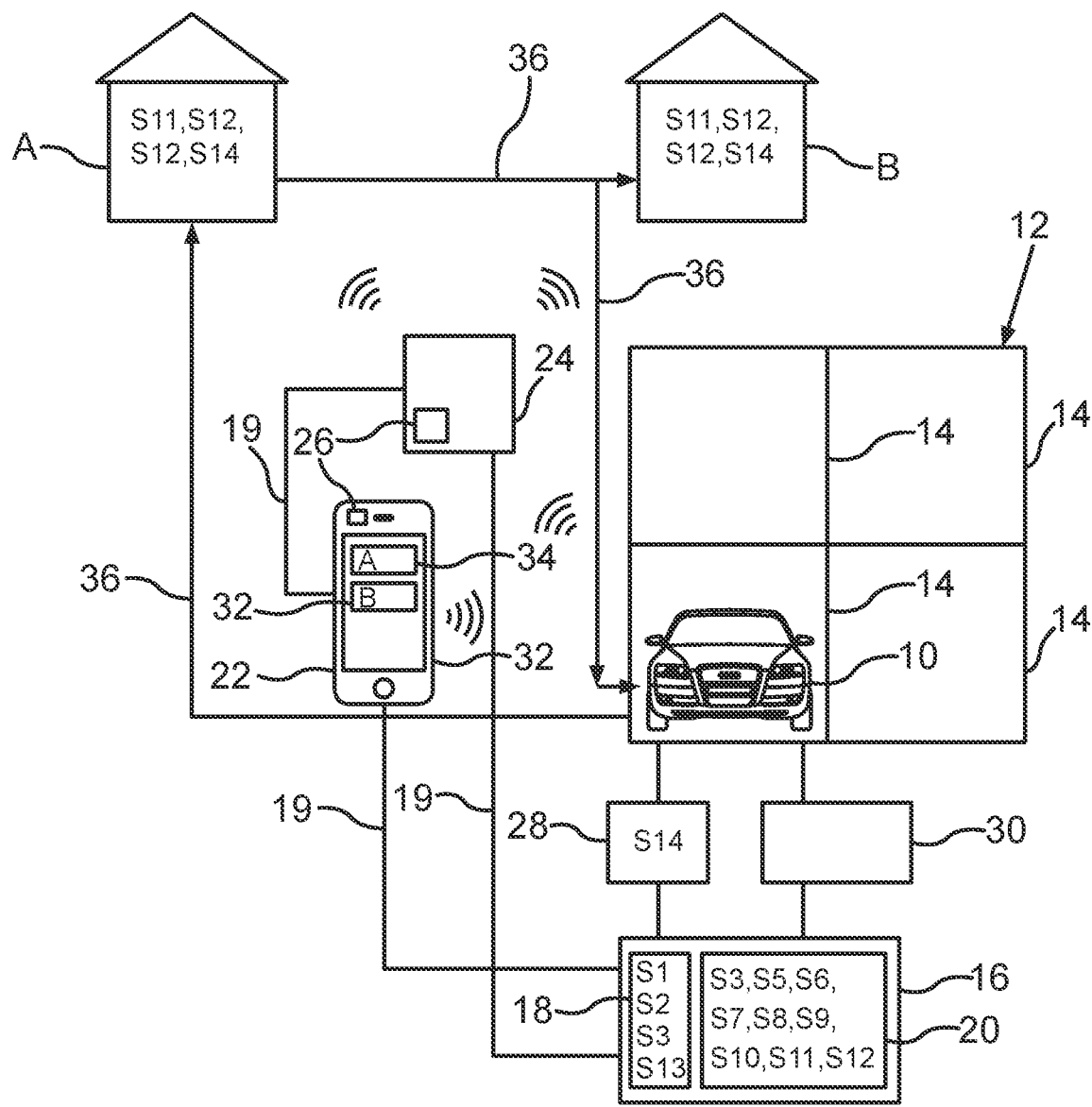

METHOD FOR OPERATING A MOTOR VEHICLE IN A FULLY AUTONOMOUS DRIVING MODE

TECHNICAL FIELD

The present application relates to a method for operating a motor vehicle in a fully autonomous driving mode.

BACKGROUND

Fully autonomous motor vehicles and systems are being developed today for fully autonomous driving, i.e. for piloted driving. The driver of the motor vehicle is relieved by the fully autonomous driving mode and is able to devote him/herself to other tasks during a drive. Thus, piloted motor vehicles open up new potential uses.

DE 10 2011 120 991 A1 describes an assistance system for supporting a delivery of shipments, wherein the delivery vehicle may be controlled by a user with the aid of a remote control. Controlling the remote control presupposes, however, that the user gives the motor vehicle control commands by means of the remote control and is therefore unable to devote him/herself to other tasks.

A method for controlling a motor vehicle fleet of a forwarding company is known from DE 10 2008 036 660 A1.

US 2015/0379468 A1 describes a method for delivering a package to a drop-off location using multiple motor vehicles.

The further cited prior art relates to a coordination of a motor vehicle fleet. An individual private person, whose mobility is dependent on the one private motor vehicle, for example, an employed person who, for example, uses the motor vehicle every day for commuting to a workplace, must either use his/her own vehicle after work or on the weekend to run errands, or order a forwarding company or, for example, a pickup service. Both options require a significant amount of time on the part of the private person since, for example, picking up a piece of merchandise from a store that has very inconvenient store hours can only be accomplished on the weekend, or since waiting times and/or additional costs result when the errand is carried out by a paid service provider.

BRIEF DESCRIPTION OF THE DRAWINGS

The sole FIGURE shows a schematic outline of an embodiment of the method according to the invention.

DETAILED DESCRIPTION

The present application relates to a method for operating a motor vehicle in a fully autonomous driving mode. A fully autonomous driving mode in this case is understood to mean a driving mode, in which the motor vehicle drives fully automatically. A corresponding fully autonomous motor vehicle may also be referred to as a piloted motor vehicle.

Fully autonomous motor vehicles and systems are being developed today for fully autonomous driving, i.e. for piloted driving. The driver of the motor vehicle is relieved by the fully autonomous driving mode and is able to devote him/herself to other tasks during a drive. Thus, piloted motor vehicles open up new potential uses.

DE 10 2011 120 991 A1 describes an assistance system for supporting a delivery of shipments, wherein the delivery vehicle may be controlled by a user with the aid of a remote control. Controlling the remote control presupposes, however, that the user gives the motor vehicle control commands by means of the remote control and is therefore unable to devote him/herself to other tasks.

A method for controlling a motor vehicle fleet of a forwarding company is known from DE 10 2008 036 660 A1.

US 2015/0379468 A1 describes a method for delivering a package to a drop-off location using multiple motor vehicles.

The further cited prior art relates to a coordination of a motor vehicle fleet. An individual private person, whose mobility is dependent on the one private motor vehicle, for example, an employed person who, for example, uses the motor vehicle every day for commuting to a workplace, must either use his/her own vehicle after work or on the weekend to run errands, or order a forwarding company or, for example, a pickup service. Both options require a significant amount of time on the part of the private person since, for example, picking up a piece of merchandise from a store that has very inconvenient store hours can only be accomplished on the weekend, or since waiting times and/or additional costs result when the errand is carried out by a paid service provider.

One object underlying the application is to improve efficiency when completing orders and/or tasks to be accomplished.

The above stated task is achieved by the method according to the application and by the devices according to the application of the independent patent claims. Additional advantageous refinements are indicated in the subclaims.

The application is based on the idea of determining an operating plan for the motor vehicle of the user, which takes into account the time periods in which the user does not need the motor vehicle to have him/herself transported. Tasks may then be integrated into this operating plan, which may be accomplished independently by the motor vehicle itself without the need for the user to intervene.

The method according to the application for operating a piloted motor vehicle includes the following steps performed by a control device. A control device in this case is understood to be a unit or a unit component, which is adapted to manage and generate control signals, and to communication with other units. The control device may include, for example, a microprocessor and/or a microcontroller and be designed, for example, as a control chip, a control board or a control unit.

A communication connection from the control device to a mobile terminal of the user is initially provided. The mobile terminal may, for example, be a smartphone, a tablet pc or another portable terminal. This is followed by a reception of an appointment calendar signal from the mobile terminal, which describes at least one appointment of the user and an associated waiting location of the motor vehicle. The appointment calendar signal in this case may, for example, be actively retrieved by the control device.

On the basis of the appointment calendar signal, a parking time period is determined, in which the motor vehicle is not used by the user to transport him/herself, i.e., a downtime of the motor vehicle, and a parking location of the motor vehicle at which the motor vehicle is parked, and an operating plan for the motor vehicle is created in accordance with the determined parking time period and the determined parking location. If, for example, an appointment calendar function of the mobile terminal includes the entry that the user is at a workplace during the day, the appointment calendar signal may then describe, for example, that the motor vehicle is parked during this time in the garage at home or, for example, in a parking space at the workplace and is not needed by the user.

At least one order signal is also received, which in each case describes a travel destination to be driven to by the motor vehicle for completing the order. For example, the order signal may be received, for example, from an order function or from a "To do" list of the mobile terminal and may describe, for example, an order to pick up cleaned clothes from a cleaning service. The order signal may then describe, for example, the geographical coordinates of the cleaning service.

On the basis of the at least one order signal, a linking route is determined for linking the at least one travel destination to the parking location and a travel time is determined for the traveling of the linking route by the motor vehicle.

A time window for traveling the linking route is established on the basis of the determined operating plan and determined travel time, and which encompasses the travel time as a minimum length. In other words, the control device establishes a time window in which the motor vehicle is able to drive the linking route.

Finally, a navigation signal, which describes the linking route, is generated by the control device, and the navigation signal is transmitted to a navigation device of the motor vehicle for controlling the motor vehicle along the linking route in the established time window.

The method according to the application allows for improved time management and the automatic completion of tasks and orders, without the user having to expend time him/herself to accomplish the tasks. The method according to the application also allows for the coordination of private appointments and of tasks to be accomplished. This results in significant time savings for the user and a significant unburdening in day-to-day life. Thus, the method according to the application allows for an improved planning of tasks to be accomplished. Moreover, a downtime of the motor vehicle is advantageously minimized, which counteracts, for example, an advancement of wear, for example, an advancement of rust to the disc brakes resulting from long downtimes. The piloted motor vehicle is utilized as efficiently as possible.

According to one particularly preferred embodiment of the method according to the application, the determination of the travel time takes into consideration in each case a time period for a waiting location of the motor vehicle at the at least one travel destination and/or a traffic condition of the linking route in accordance with a traffic condition signal received from a motor vehicle external data server apparatus. A time period for a waiting location of the motor vehicle may, for example, be specified as a default setting in a memory of the control device. The aforementioned traffic condition signal may describe, for example, a traffic jam or a construction site on the linking route, on the basis of which the control device may determine a delay and, therefore a prolonged travel time. The scheduling is improved still further as a result and a likelihood that the motor vehicle is again on time at the parking location is significantly increased.

To regulate an access to the motor vehicle at the travel destinations, an instantaneous position of the motor vehicle may be established, for example, via a GPS signal, during the operation of the motor vehicle on the linking route, and the established position may be compared to coordinates of the at least one travel destination. For this purpose, the control device may, for example, cooperate with a navigation unit, i.e., a device for navigating the motor vehicle. The navigation device in this case may be designed, for example, as a navigation unit. Such a navigation device may, for example, transmit the position signal for establishing the instantaneous position to the control device via a databus of the motor vehicle. Alternatively, the navigation device may, for example, carry out such a tracking and forward the determined instantaneous position to the control device. If, according to this embodiment of the method according to the application, the travel destination coincides with the established, instantaneous position, a motor vehicle door may then be unlocked. For this purpose, the control device may, for example, generate an unlocking signal and transmit it to a locking device of the motor vehicle.

In one refinement, the unlocking signal may be received from a motor vehicle-external data server apparatus. The motor vehicle door may be unlocked as a function of the received unlocking signal. With this refinement, a service provider at the travel destination may, for example, actively open the motor vehicle and in this way place a product inside, for example. The unlocking signal may, for example, be transmitted by the user of the motor vehicle from his/her mobile terminal to the motor vehicle-external data server apparatus. The unlocking signal may describe a code or a PIN, for example.

According to another embodiment, the instantaneous position of the motor vehicle may be established and the established position may be compared with coordinates of the at least one travel destination, in order to then detect an interior of the motor vehicle by the sensor unit of the motor vehicle if the travel destination coincides with the established, instantaneous position. In this way, an interior of the motor vehicle may be monitored. The user may thus check which person has procured access to the motor vehicle or what has be placed in or removed from the motor vehicle.

The above stated object is also achieved by a control device, which preferably also includes a processor device, wherein the processor device may include a microcontroller and/or a microprocessor. The control device is adapted to carry out, preferably via the processor device, the method steps relating to a control device pursuant to a method according to one of the above described embodiments of the method according to the application. This results in the aforementioned advantages.

The above stated object, while achieving the aforementioned advantages, is also achieved by a memory medium, for example, a hard disk or a memory chip that includes a program code, wherein the program code, when executed by the control device of a mobile terminal, is configured to carry out a method pursuant to one of the above described embodiments of the method according to the application.

The above stated object is also achieved by a mobile, portable terminal that includes a memory medium according to an embodiment of the invention. The mobile, portable terminal in this case may be designed preferably as a smartphone or as a tablet PC. The aforementioned advantages result here as well.

The aforementioned advantages also result from a data server apparatus according to the application for operating on the Internet, which includes a memory medium according to an embodiment of the invention.

The above stated object is also achieved by a motor vehicle, which includes a control device according to an embodiment of the invention and may be designed preferably as a car, for example, as a passenger car. This, too, results in the aforementioned advantages.

The application is explained once more in greater detail by a concrete exemplary embodiment with reference to the appended drawing. The exemplary embodiment explained below is a preferred embodiment of the invention. In this exemplary embodiment, however, the components of the embodiment described each represent individual features of the application to be considered separately from one another, which refine the application in each case also independently of one another and thus are also to be considered individually or in a combination other than the combination shown as part of the application. Moreover, the embodiment described may also be supplemented by additional of the previously described features of the application. Functionally equivalent elements have the same reference numerals in the FIGURE. The sole FIGURE shows: a schematic outline of an embodiment of the method according to an embodiment of the invention.

The sole FIGURE illustrates the principle of the method according to the invention based on an exemplary embodiment. For this purpose, the FIGURE shows a motor vehicle 10, which may be designed, for example, as a car, preferably as a piloted passenger car. In the example in the FIGURE, the motor vehicle 10 may, for example, be currently parked in a garage 12, which may have four parking spaces, 14, for example. The garage 12 may be located, for example, at a workplace of the user.

The FIGURE also shows an apparatus including a control device 16 and a sensor device 28. The control device 16 may include, for example a communication unit 18 and/or a processor device 20. The control device 16 may, for example, be designed as a control board of the motor vehicle 10 or of a mobile terminal 22 of the user. Alternatively or in addition, the control device 16 may also be designed as a component of a motor vehicle-external data server apparatus 24. The optional processor device 20 may, for example, include a microchip and/or a microcontroller. Both the mobile, portable terminal 22, which may be designed as a smartphone or as a tablet PC, for example, as well as the motor vehicle-external data server apparatus 24, which may comprise a data server and/or an Internet platform, show by way of example a memory medium 26 in the FIGURE, for example a hard disk or a memory chip, on which a corresponding program code may be stored for carrying out the method according to an embodiment of the invention. The control device 16 in this case may also be designed as an application ("App") program for a computer.

Communication unit 18 is understood to be a unit component for communicating via a wireless or wired communication connection 19. For this purpose, the communication unit 18 may, for example, include a transponder and/or transmitter and/or a receiver.

The motor vehicle 10 in the FIGURE may, for example, also include the sensor device 28, which may comprise a radar or a video camera, for example. The FIGURE also shows an optional navigation device 30, which may be designed as a navigation unit or as navigation software, for example, and in the example of the FIGURE, may be installed in the motor vehicle 10.

A display or screen 32 is also visible in the FIGURE on the exemplary mobile, portable terminal 22 in the FIGURE, on which display elements 34 may be shown.

The FIGURE also shows a linking route 36, which may initially lead from the parking location 14 to a first travel destination A for a first errand, and subsequently from the first travel destination A to another travel destination B for a second errand. The linking route 36 may then, for example, lead back to the parking location 14 of the garage 12.

In the example of the FIGURE, the user may have entered a daily schedule on his/her mobile terminal 22. For example, it may be optionally provided that the mobile terminal 22 may, for example, retrieve a user profile from the external data server apparatus 24. In the process, a piece of information, for example, that the user is at work, for example, from Monday through Friday, in each case from 8:00 AM to 6:00 PM, and drives his/her motor vehicle 10 to his/her workplace and parks the motor vehicle 10 in the garage 14 during working hours, may be transmitted to the mobile terminal 22. The user may decide, for example, that on this day he/she would like to accomplish two tasks, for example, pick up laundered shirts at a first travel destination A, a cleaning service, and to pick up groceries purchased over the Internet at a travel destination B. Even though, for example, the cleaning service may already open at 7:00 AM, the user may find it too troublesome to drive in commuter traffic first to the cleaning service, the travel destination A, and subsequently to his/her workplace. Because he/she also does not wish to drive to travel destination B in the evening because there are always many people shopping after work, he/she may, for example, open an application program via a control unit (not shown in the FIGURE) of the mobile, portable terminal 22, for example, a touch-sensitive screen or a keypad and input the two errands to be accomplished. The respective coordinates of the travel destinations A and B may, for example, already be stored in the mobile terminal 22 or may be retrieved from the motor vehicle-external data server apparatus 24.

The user then drives to his/her workplace at 7:30 AM in the morning, for example. In a first method step S1, the control device 16 may provide a communication connection 19 to the mobile terminal 22, for example, an Internet connection. From the mobile terminal 22, the control device 16 may then receive an appointment calendar signal, which may describe his/her working hours and the location of the garage 12 (S2). The control device 16 may determine (S3), that the parking time period, i.e., a time period in which the motor vehicle 10 is not used by the user, may be 10 hours long. It may optionally be provided that times in which the user does not use the motor vehicle 10 may be statistically calculated. If, for example, the user needs his/her motor vehicle 10 during a lunch break in order, for example, to drive to lunch, he/she may then input, for example, a lunch break into the mobile terminal 22, in which the motor vehicle 10 is being used. The appointment calendar signal may then, for example, describe a first parking time period from, for example, 8:00 AM to 11:30 AM, as well as an additional parking time period from 1:00 PM to 6:00 PM. It may optionally be provided that the point in time at which the motor vehicle 10 is parked may be determined, for example, by the control device 16 being able to detect as to when the motor vehicle 10 is no longer in operation.

The parking time period is determined (S3) on the basis of the appointment calendar signal, and an operating schedule for the motor vehicle 10 may be determined, which describes the parking time period and optionally the parking location of the motor vehicle. The control device 16 also receives an order signal (S4) which, in the example of the FIGURE, describes the travel destinations A and B. The order signal in this case may describe the geographical coordinates of the travel destinations A and B. Based on the order signal, the control device 16 determines the linking route 36 (S5). As previously described above, the linking route in the example of the FIGURE initially leads from the parking location 14 to the travel destination A, from there to the travel destination B, and then back again to the parking location 14. The motor vehicle 10 may receive the geographical data of the utilized parking location 14, for example, via the navigation device 30. On the basis of all coordinates, the control device 16 is able to determine the linking route 36 and the required travel time (S6). In the example of the FIGURE, a travel time for the linking route 36 may be, for example, 50 minutes.

The control device 16 may also receive from the motor vehicle-external data server apparatus 24 a traffic condition signal or a traffic information signal, for example, which may describe, for example, a 10-minute delay between the travel destination A and the travel destination B. This delay may be included in the determination of the travel time S6, which may result in a travel time of 60 minutes. To provide a sufficient buffer for accomplishing the tasks on-site, i.e., picking up the shirts at the cleaning service and picking up the purchased goods at the supermarket, an additional 10 minutes, respectively, may be considered for each travel destination A, B, for example, for loading the motor vehicle 10, which may result in a travel time of 1 hour and 20 minutes.

In the method step S7, the previously determined, exemplary time window in the morning and in the afternoon may be compared with the travel time duration. In the example in the FIGURE, it may happen that the errands could be accomplished both in the morning as well as in the afternoon.

At 8:45 AM, for example, the control device 16 may generate a navigation signal (S8), which may describe the linking route from the parking location 14 to the travel destination A, then to the travel destination B and then back again to the parking location 14 at the workplace of the user. This navigation signal may be transmitted to the navigation device 30 of the motor vehicle 10, for example, via a databus of the motor vehicle 10. The navigation signal may describe both the linking route 36, as well as the waiting time at the travel destinations A, B and on data of the motor vehicle. Alternatively, it may be provided, for example, that the navigation signal may be generated (S8) already at the start of the established time window, or when establishing that the user may have switched off the motor vehicle and left it.

The motor vehicle 10 may then initially drive to the first travel destination A. In the process, the navigation signal 30 may, for example, transmit a piece of information regarding a respective, instantaneous position of the motor vehicle 10 to the control device 16, which the control device then establishes or determines (S10). By comparing the established position with the travel destination A (S11), the control device 16 is able to recognize when the travel destination A is reached. To enable the employees at the cleaning service to then load the laundered shirts, the control device 16 may generate an unlocking signal, for example, which unlocks a motor vehicle door, i.e., a side door or trunk lid (S12), for example. Alternatively or in addition, the unlocking signal may be received from the motor vehicle-external data server apparatus (S13), which may, for example, describe an unlocking code, which the user may have previously transmitted to the motor vehicle-external data server apparatus 24 and, in this way, to the cleaning service, for example, with the aid his/her mobile terminal 22 and with the aid of an Internet connection. The motor vehicle 10 may then, for example, only be opened by an employee of the cleaning service and/or, somewhat later at the travel destination B, by an employee of the supermarket, who may also have previously received such an unlocking code from the user.

The sensor device 28, which may also include a camera, for example, may optionally be switched on upon reaching the travel destination A, B, and the sensor device 28 may then detect (S14) what is occurring in the interior of the motor vehicle 10. In other words, the user may monitor who places what when in the motor vehicle and whether an employee at the travel destination A, B, is possibly also doing something else.

The method steps S1*l* and S14 in the FIGURE are also depicted at the travel destinations A, B, in order to illustrate that these method steps may be carried out preferably at the travel destinations A, B. After picking up the shirts at the cleaning service, the motor vehicle 10 may then drive further along linking route 36 to the travel destination B. Similar to the process of loading the shirts, the ordered purchases may be loaded at the travel destination B. Once this is accomplished, the motor vehicle 10 may then start the return trip to the parking location 14. If the motor vehicle 10 left at 8:45 AM, it may, if adhering to the travel schedule, be back at the parking location 14 again at 10:05 AM. Thus, it is available in time again if the user needs the motor vehicle 10 at 11:30 AM for the lunch break.

The above described exemplary embodiment illustrates the principle of the application of providing services of a piloted motor vehicle 10.

According to another exemplary embodiment, the autonomously driving motor vehicle 10 may accomplish errands independently. For this purpose, the corresponding motor vehicle 10 may be networked, for example, via Internet connections, Bluetooth connections or WLAN connections. The user or owner of such a motor vehicle 10 may, for example, schedule and/or book an errand using, for example, software specifically developed for such purpose. The autonomous motor vehicle 10 may then be planned and/or booked for times at which it is not needed or for scheduled services, to perform such a service. Respective cooperating enterprises such as, for example, parcel services or cleaning services may then receive an order for service, for example, and may then prompt, for example, an opening of a storage compartment, for example, of a trunk, of a passenger space or of another loading compartment provided for such purpose using this exemplary software, in order to be able to retrieve or to deposit the items received or to be picked up from this loading compartment.

The invention claimed is:
1. A method for operating a motor vehicle, comprising:
providing a communication connection to a mobile terminal of a user of the motor vehicle;
receiving an appointment calendar signal from the mobile terminal, which describes at least one appointment and an associated waiting location of the motor vehicle;
determining a parking time period based on the appointment calendar signal, in which the motor vehicle is not used by the user, and a parking location of the motor vehicle, at which the motor vehicle is parked, and creating an operating plan for the motor vehicle in accordance with the determined parking time period and with the determined parking location;
receiving at least one order signal, which describes in each case a travel destination to be driven to by the motor vehicle;
determining a linking route based on of the at least one order signal for linking the at least one travel destination to the parking location, and determining a travel time for traveling the linking route;
establishing a time window based on of the determined operating plan and the determined travel time for traveling the linking route, the established time window encompassing the travel time as a minimum length;
generating a navigation signal, which describes the linking route and transmitting the navigation signal to a navigation device of the motor vehicle for controlling the motor vehicle along the linking route in the time window;

establishing an instantaneous position of the motor vehicle via the control device;

comparing the established position with coordinates of the at least one travel destination via the control device;

detecting an interior of the motor vehicle via a sensor device of the motor vehicle when the travel destination coincides with the instantaneous position;

allowing monitoring that an object is placed in the motor vehicle, wherein the object is associated with the travel destination; and after monitoring that the object is placed in the motor vehicle, controlling the motor vehicle to return to the parking location based on the linking route.

2. The method according to claim 1, wherein the determining of the travel time includes:

in each case taking into consideration a time period for a waiting of the motor vehicle at the at least one travel destination and/or a traffic condition of the linking route in accordance with a traffic condition signal received from a motor vehicle-external data server apparatus.

3. The method according to claim 1, further comprising:

establishing an instantaneous position of the motor vehicle during the operation of the motor vehicle on the linking route;

comparing the established position with coordinates of the at least one travel destination; and unlocking a motor vehicle door when the travel destination coincides with the instantaneous position.

4. The method according to claim 3, further comprising:

receiving an unlocking signal from a motor vehicle-external data server apparatus, the motor vehicle door being unlocked as a function of the received unlocking signal.

5. An apparatus comprising a sensor device and a control device that includes a processor device and a communication unit, wherein the apparatus is configured to:

communicate, by the communication unit, with a mobile terminal of a user of a motor vehicle;

receive, by the communication unit, an appointment calendar signal from the mobile terminal, which describes at least one appointment and an associated waiting location of the motor vehicle;

determine, by the processor device, a parking time period based on the appointment calendar signal, in which the motor vehicle is not used by the user, and a parking location of the motor vehicle, at which the motor vehicle is parked, and create an operating plan for the motor vehicle in accordance with the determined parking time period and with the determined parking location;

receive, by the communication unit, at least one order signal, which describes in each case a travel destination to be driven to by the motor vehicle;

determine, by the processor device, a linking route based on the at least one order signal for linking the at least one travel destination to the parking location, and determine a travel time for traveling the linking route;

establish, by the processor device, a time window based on of the determined operating plan and the determined travel time for traveling the linking route, the established time window encompassing the travel time as a minimum length;

generate, by the processor device, a navigation signal, which describes the linking route and transmit the navigation signal to a navigation device of the motor vehicle for controlling the motor vehicle along the linking route in the time window;

establish an instantaneous position of the motor vehicle via the control device;

compare the established position with coordinates of the at least one travel destination via the control device;

detect an interior of the motor vehicle via the sensor device of the motor vehicle when the travel destination coincides with the instantaneous position;

allow monitoring that an object is placed in the motor vehicle, wherein the object is associated with the travel destination; and after monitoring that the object is placed in the motor vehicle, control the motor vehicle to return to the parking location based on the linking route.

6. A motor vehicle comprising a sensor device and a control device configured to:

provide a communication connection to a mobile terminal of a user of the motor vehicle;

receive an appointment calendar signal from the mobile terminal, which describes at least one appointment and an associated waiting location of the motor vehicle;

determine a parking time period based on of the appointment calendar signal, in which the motor vehicle is not used by the user, and a parking location of the motor vehicle, at which the motor vehicle is parked, and create an operating plan for the motor vehicle in accordance with the determined parking time period and with the determined parking location;

receive at least one order signal, which describes in each case a travel destination to be driven to by the motor vehicle;

determine a linking route based on the at least one order signal for linking the at least one travel destination to the parking location, and determine a travel time for traveling the linking route;

establish a time window based on the determined operating plan and the determined travel time for traveling the linking route, the established time window encompassing the travel time as a minimum length;

generate a navigation signal, which describes the linking route;

transmit the navigation signal to a navigation device of the motor vehicle for controlling the motor vehicle along the linking route in the time window;

establish an instantaneous position of the motor vehicle via the control device;

compare the established position with coordinates of the at least one travel destination via the control device;

detect an interior of the motor vehicle via the sensor device of the motor vehicle when the travel destination coincides with the instantaneous position;

allow monitoring that an object is placed in the motor vehicle, wherein the object is associated with the travel destination; and after monitoring that the object is placed in the motor vehicle, control the motor vehicle to return to the parking location based on the linking route.

7. The apparatus according to claim 5, wherein the apparatus is further configured to determine the travel time by:

in each case taking into consideration a time period for a waiting of the motor vehicle at the at least one travel destination and/or a traffic condition of the linking route in accordance with a traffic condition signal received from a motor vehicle-external data server apparatus.

8. The apparatus according to claim 5, further configured to:
   establish an instantaneous position of the motor vehicle during the operation of the motor vehicle on the linking route;
   compare the established position with coordinates of the at least one travel destination; and
   unlock a motor vehicle door when the travel destination coincides with the instantaneous position.

9. The apparatus according to claim 8, further configured to:
   receive an unlocking signal from a motor vehicle-external data server apparatus, the motor vehicle door being unlocked as a function of the received unlocking signal.

10. The motor vehicle according to claim 6, wherein the control device is further configured to determine the travel time by:
    in each case taking into consideration a time period for a waiting of the motor vehicle at the at least one travel destination and/or a traffic condition of the linking route in accordance with a traffic condition signal received from a motor vehicle-external data server apparatus.

11. The motor vehicle according to claim 6, wherein the control device is further configured to:
    establish an instantaneous position of the motor vehicle during the operation of the motor vehicle on the linking route;
    compare the established position with coordinates of the at least one travel destination; and
    unlock a motor vehicle door when the travel destination coincides with the instantaneous position.

12. The motor vehicle according to claim 11, wherein the control device is further configured to:
    receive an unlocking signal from a motor vehicle-external data server apparatus, the motor vehicle door being unlocked as a function of the received unlocking signal.

* * * * *